Oct. 21, 1969  G. CLOSE  3,473,484
CART REMOVAL DEVICE

Filed Jan. 17, 1967  4 Sheets-Sheet 1

INVENTOR.
GARTH CLOSE
BY
Woodhams, Blanchard & Flynn
ATTORNEYS

INVENTOR.
GARTH CLOSE

Oct. 21, 1969  G. CLOSE  3,473,484
CART REMOVAL DEVICE
Filed Jan. 17, 1967  4 Sheets-Sheet 3

INVENTOR.
GARTH CLOSE
BY
Woodhams, Blanchard & Flynn
ATTORNEYS

Oct. 21, 1969  G. CLOSE  3,473,484
CART REMOVAL DEVICE
Filed Jan. 17, 1967  4 Sheets-Sheet 4
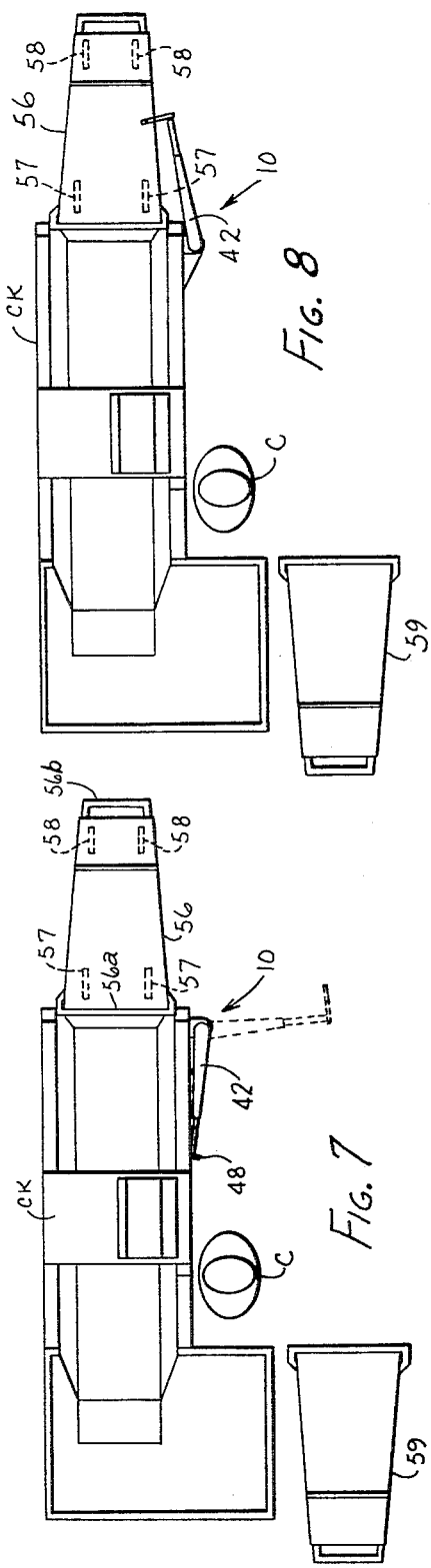
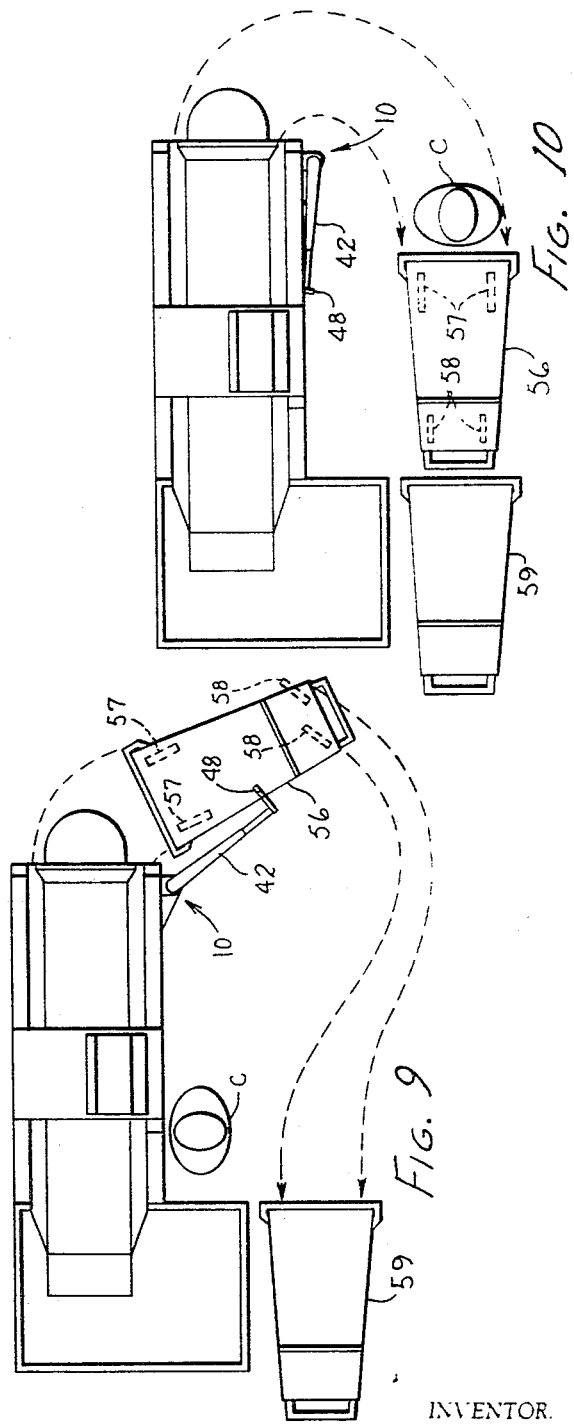
INVENTOR.
GARTH CLOSE
BY
Woodhams, Blanchard and Flynn
ATTORNEYS United States Patent Office 3,473,484
Patented Oct. 21, 1969

3,473,484
CART REMOVAL DEVICE
Garth Close, Lubbock, Tex., assignor to United Steel and Wire Company, Battle Creek, Mich., a corporation of Michigan
Filed Jan. 17, 1967, Ser. No. 609,930
Int. Cl. B61b *13/00;* E04h *3/04;* A47f *10/00*
U.S. Cl. 104—162        6 Claims

ABSTRACT OF THE DISCLOSURE

A shopping cart control device for controlling the flow of shopping carts after same have been unloaded at the checkstand having an arm equipped with shopping cart engaging means. The shopping cart control device is further provided with driving means for moving the arm into engagement with a shopping cart and subsequently thereto moving the arm having a shopping cart engaged therewith to a predesignated destination. The control device is further provided with a cart release device for releasing the shopping cart automatically when same has reached its predesignated destination.

---

This invention relates to a cart control device and more particularly relates to cart removal means for removing a shopping cart from the unloading area adjacent a checkstand within a supermarket.

The control of shopping carts in a supermarket in the area of the checkstand has always been a problem, both for incoming customers and customers leaving with purchased and bagged merchandise. That is, customers leaving the store oftentimes push the cart out of the customer aisle between the checkstands and leave it in the middle of the floor. They do not take the time to nest their cart with other similar carts. As a result, the incoming customers must walk around the carts that are standing in the middle of the floor. When the store is very busy and many customers are in the area of the checkstands, the number of shopping carts standing in the middle of the floor can be quite large and the congestion resulting therefrom can present a serious and well recognized problem.

In other cases, the checker is expected to push the cart away from the checkstand but this works no better since it requires the maximum attention from the checker at exactly the time she is the busiest checking merchandise. Hence, again, the carts tend to accumulate.

Accordingly, the objects of this invention include:

(1) To provide apparatus for systematically controlling the flow of carts around the area of the checkstand.

(2) To provide apparatus for automatically removing a cart from the unloading area of the checkstand without any requirement for assistance on the part of either the customer or the checker.

(3) To provide apparatus for controlling the movement of a shopping cart after it has been unloaded to thereby remove the congestion around the entrances and exits to the supermarket.

(4) To provide apparatus for removing a shopping cart from the unloading station of a checkstand which is safe and will not injure customers and/or working personnel.

(5) To provide apparatus for systematically controlling the flow of shopping carts around a checkstand which is of simple construction and relatively maintenance free.

(6) To provide apparatus for systematically controlling the flow of carts around a checkstand to increase the speed of flow of customers and merchandise past the checkstand.

Other objects and purposes of this invention will be apparent to persons acquainted with apparatus of this general type upon reading the following specification and inspecting the accompanying drawings.

In the drawings:

FIGURES 7–10 illustrate one way in which the shopping carts are systematically controlled around the area of the checkstand.

Figure 13:
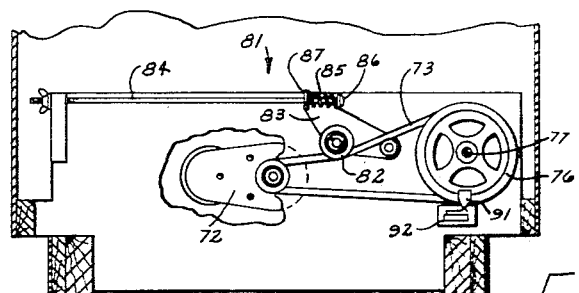
FIGURE 13 is a sectional view taken along line XIII—XIII of FIGURE 11.
Figure 1:
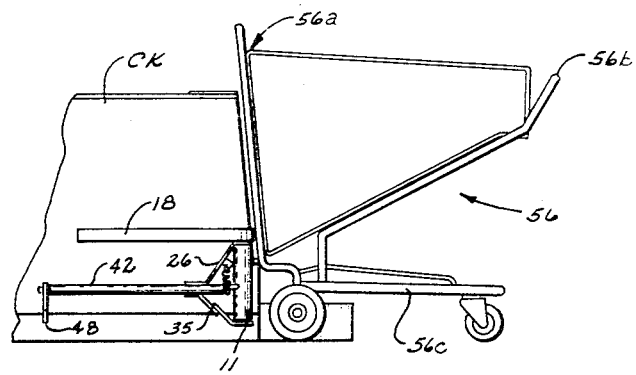
FIGURE 1 is an elevational view of a cart in unloading position at a checkstand with the cart control device of the invention applied thereto.

Certain terminology will be used in the following description for convenience of reference only and will not be limiting. The words "upwardly," "downwardly," "rightwardly" and "leftwardly" will designate directions in the drawings to which reference is made. The words "forwardly" and "rearwardly" will refer to directions to the right and to the left, respectively, in FIGURES 10 and 11. The words "inwardly" and "outwardly" will refer to directions toward and away from, respectively, the geometric center of the device and designated parts thereof. Said terminology will include the words specifically mentioned, derivatives thereof and words of similar import.

GENERAL DESCRIPTION

In general, the objects and purposes of the invention have been met by providing a shopping cart control device for controlling the flow of shopping carts after same have been unloaded at the checkstand. The device comprises an arm equipped with shopping cart engaging means. The shopping cart control device is further provided with driving means for moving the arm into engagement with a shopping cart and subsequently thereto moving the arm having a shopping cart engaged therewith to a predesignated destination. The control device is further provided with a cart release device for releasing the shopping cart automatically when same has reached its predesignated destination.

DETAILED DESCRIPTION

In its narrower aspects, the subject matter of the present invention has been designed for use with the checkstand and cart set forth in copending joint application of myself and Harold Ruttenberg, filed concurrently herewith and assigned to the same assignee as the present application. Particularly, said narrower aspects of the invention are directed toward apparatus embodying the invention as utilized in such environment and in combination with the cart and checkstand set forth in said application. In its broader aspects, however, the subject matter of the present invention is applicable for use with other checkstands and with other carts and it will, accordingly, be recognized that insofar as such broader aspects are concerned, the use herein of the particular cart and checkstand of said application is illustrative only and not limiting.

Referring, therefore, first to FIGURES 7–10, it will be seen that there is assumed to be a checkstand "CK" of a type which is set forth in said application and which receives a cart 56 as also shown in said application in end-to-end relationship therewith for unloading, in this case for automatic unloading. Said shopping cart 56 unloads through its forward end 56a and is provided with a handle 56b for grasping by the shopper. Said cart has a pair of fixed-axis wheels 57 and a pair of swivelly mounted wheels 58. It is desired to move said card from the unloading position shown by cart 56 in FIGURE 7 to the position shown by cart 59 in FIGURE 10.

Figure 11:
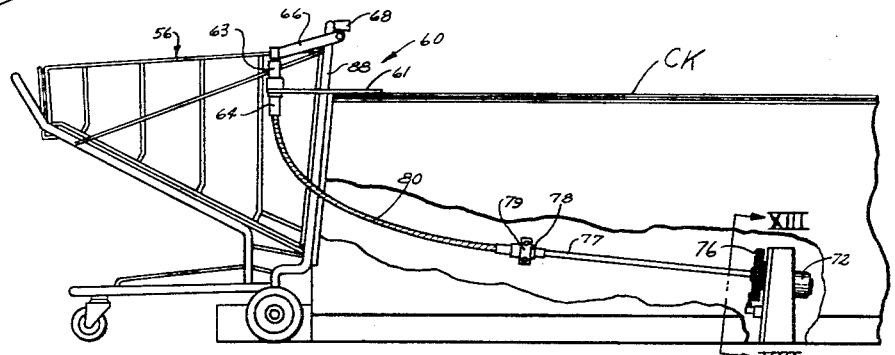
FIGURE 11 is a side elevational view of a modified cart control system.
Figure 12:
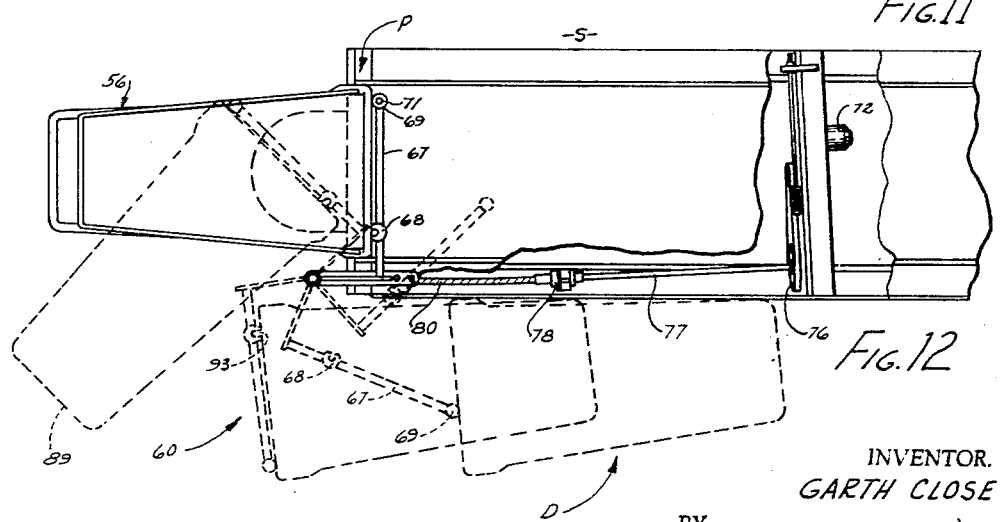
FIGURE 12 is a top view of the modified cart control system.

Similarly and with respect to FIGURES 11 and 12, it is desired to move a cart 56, of the same type as that shown in FIGURES 7–10 and associated with the same check stand "CK" as shown in FIGURES 7–10, from the position of cart 56 in FIGURES 11 and 12 to the broken line position indicated at "D" in FIGURE 12.

Referring first to FIGURES 7–10, a cart moving means is mounted at the corner of the checkstand "CK" adjacent the end thereof at which the cart 56 is unloaded and facing the side toward which said cart is to be moved, said location being indicated by the placement of the cart control device as shown in FIGURES 7–10.

A cart control device 10 embodying the invention is illustrated in the figures. The cart control device of FIGURES 1–10 comprises a bearing support housing 11 secured to a wall structure 13, which may be the side of a checkstand, by a plurality of bolts 14. The bearing housing 11 rotatably supports a vertical shaft 12 therein. The extremity of the bearing housing is further provided with a dowel pin 16 protruding outwardly from the surface thereof. The purpose of this construction will be discussed later. The upper end of the shaft 12 is provided with a gear 17 (FIGURE 3) and is rotatable therewith. The gear 17 supports a chain 18. One end of the chain 18 is secured to a pulley 19 (dotted lines) driven for rotation, usually through a gear box 20, by a drive motor 21 (schematically indicated in dotted lines in FIGURE 3). The other end of the chain 18 is fastened to one end of a spring 22. The other end of the spring 22 is secured to the wall structure 13 by any conventional means such as a hook 23 on the spring 22 engaged with the eye of an eyebolt 24. The spring 22 in this embodiment is under tension when the control device is in the position illustrated in solid lines in FIGURES 2, 3 and 4.

Figure 3:
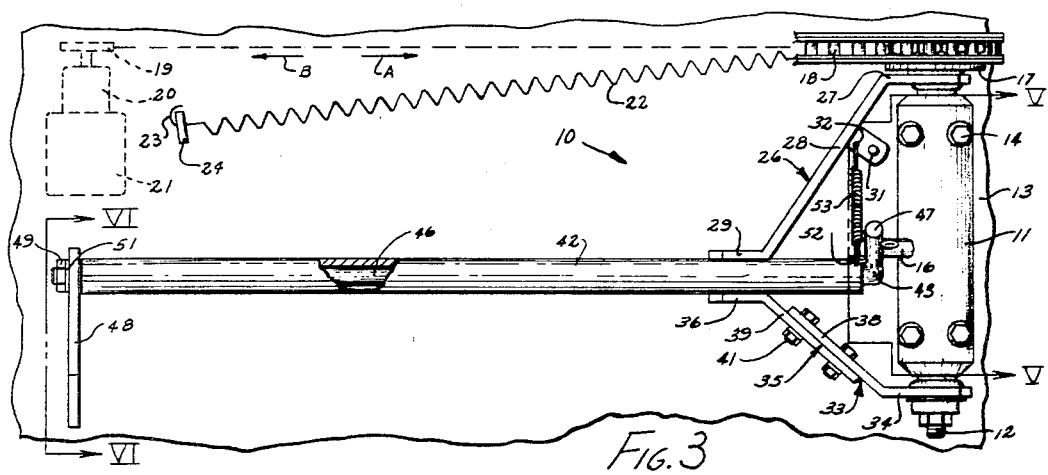
FIGURE 3 is a side elevational view of the cart control device.

An S-shaped brace 26 is provided between the upper end of the bearing housing 11 and the gear 17 and comprises legs 27, 28 and 29, leg 27 being fixedly secured to the shaft 12. The underside of the leg 28 is provided with a bracket 31 having an opening 32 therein. A similar S-shaped brace 33 having legs 34, 35 and 36 is secured by leg 34 to the shaft 12 at the lower end of the bearing housing 11. In this particular embodiment, the leg 35 is severed and two leg members 38 and 39 are overlapping and secured to each other by bolts 41. Leg 29 of brace 26 and leg 36 of brace 33 are vertically spaced and essentially horizontal as illustrated in FIGURE 3. A tubular arm 42 is weldably secured between the legs 29 and 36, the axis of said arm intersecting the axis of the shaft 12 and being perpendicular thereto. The tubular arm 42 houses a leg 46 of an L-shaped rod 43 which latter is rotatable with respect thereto. The outer end of the leg 46 is provided with a hook 48 secured thereto by a nut 49 and a lock washer 51.

The leg 47 of the rod 43 extends at a right angle away from the axis of the leg portion 46. An eyelet 52 is provided intermediate the ends of the leg 47. One end of a spring 53 is connected to the eyelet 52 and the other end of the spring 53 is connected to the opening 32 in the bracket 31. The spring 53 biases the leg 47 in a vertical position as indicated in dotted lines in FIGURE 2.

Figure 2:
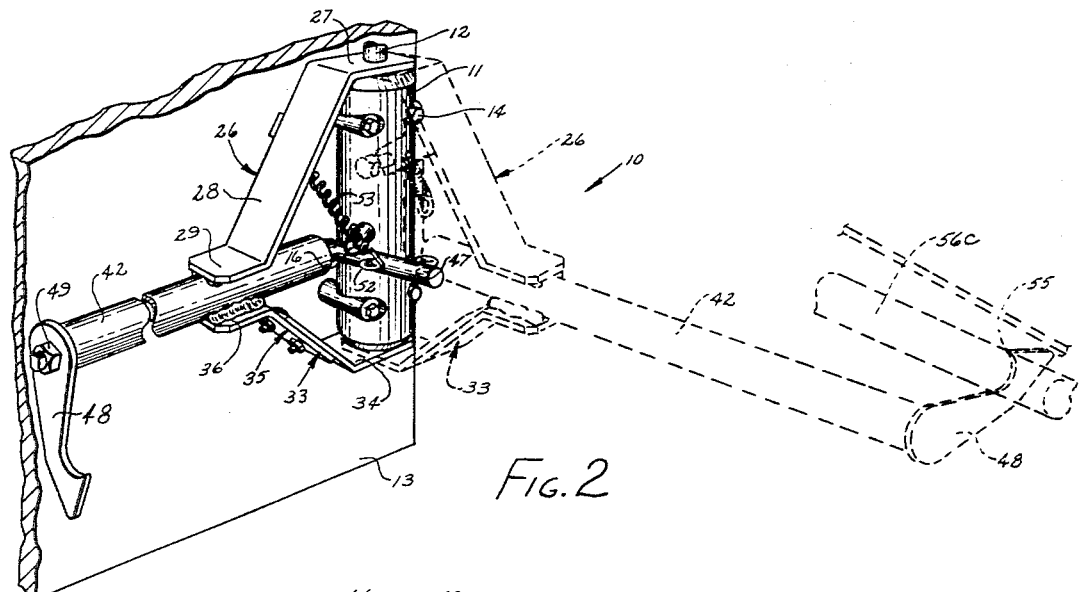
FIGURE 2 is a perspective view of a cart control device embodying the invention.

The leg 47 is positioned so that when the arm 42 is in the retracted position, as illustrated in solid lines in FIGURE 2, it contacts the pin 16 and is approximately horizontally aligned. In such position, the hook 48 extends downwardly.

For illustrative purposes, the cart 56 is further indicated by the horizontal rod 56c (FIGURES 1 and 2) which may be any generally longitudinal, substantially horizontal, portion of the cart such as the wheel supported base portion thereof.

While this cart control means is adapted for use with a wide variety of carts, the here illustrated embodiment is particularly designed for use with the cart shown in my above-mentioned copending application. In said cart, the wheels at the rightward (FIGURES 7–10) end are on swivel casters and the wheels at the leftward end are on fixed or swiveled axes as desired.

OPERATION

Although the operation of the device embodying the invention has been indicated somewhat above, said operation will be described in detail hereinbelow to assure a more complete understanding of the invention.

Figure 4:
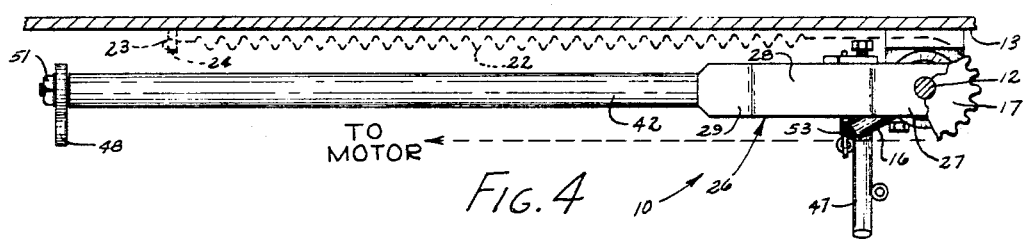
FIGURE 4 is a top view of the cart control device.
Figure 6:
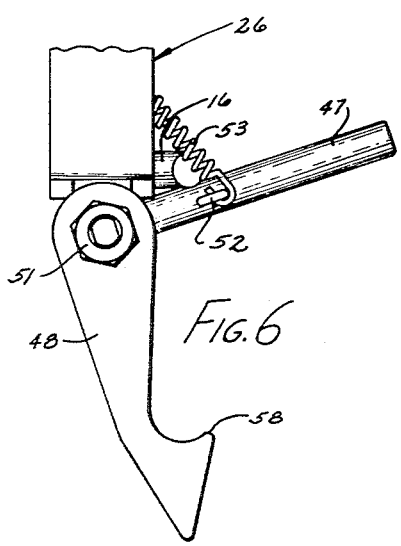
FIGURE 6 is an end view of the cart removal device taken along line VI—VI of FIGURE 3.
Figure 5:
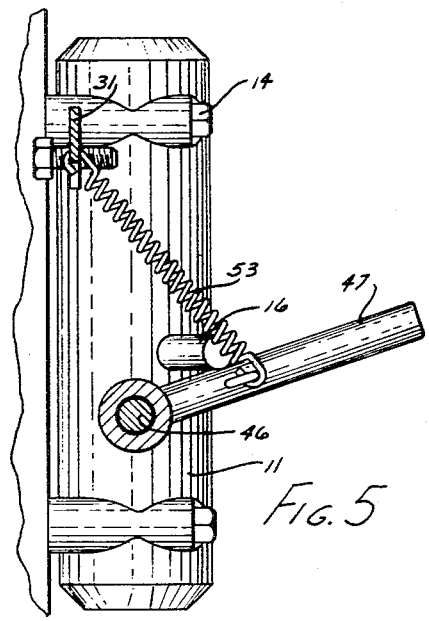
FIGURE 5 is a sectional view taken along line V—V of FIGURE 3.

The arm 42 is shown in its retracted position in FIGURES 2, 4 and 7 and in solid lines. It is moved into this position by operation of the motor 21 as set forth in more detail hereinafter and is held in such position when the motor is de-energized by any convenient holding means, such as by a brake applied to the rotor of the motor, or by conventional worm and worm gear means in the gear box 20. When the holding means is de-energized, or the motor 21 is run in a reverse direction, the tension on the spring 22 will pull the chain 18 rightwardly as indicated by the arrow A in FIGURE 3. Movement of the chain 18 rightwardly will cause the arm 42 to swing counterclockwise about the shaft 12 as viewed in FIGURE 4 to the final position illustrated schematically in FIGURE 8. As the arm 42 rotates, the leg 47 is pulled away from the pin 16 so that when the arm 42 has reached the midpoint of its swing from the FIGURE 7 position to the FIGURE 8 position, (dotted lines in FIGURE 7), the spring 53 is permitted to draw the leg 47 upwardly to the vertical dotted line position illustrated in FIGURE 2. Thus, the hook 48 is moved from the vertical downward position to the horizontal position illustrated in solid and dotted lines, respectively, in FIGURE 2. The hook 48 is permitted to engage one side of the cart 56. In this particular embodiment, the hook is permitted to engage a frame member 56c, the spring 53 permitting the hook 48 to slip under the frame member 56c. That is, the hook 48 is permitted to rotate clockwise about the axis of the arm 42 as viewed in FIGURE 2 so that the nose 55 thereof will be depressed to slide under the frame member 56c. When the hook has reached the other side of the frame member 56c, the spring will cause the hook to snap upwardly thus engaging the frame member 56c therewith. At this point, the yielding of the arm 42 to the spring 22 is stopped and the arm 42 is held in the extended position illustrated in FIGURE 8.

By using the spring 22 to move the arm into cart engaging position, instead of the motor, danger of injury to personnel who might be in the way is avoided. The same objective can be attained by driving the arm with the motor from its FIGURE 3 (FIGURE 7) position to its FIGURE 8 position through a lightly tensioned slip clutch.

After the cart has been unloaded, the checker can then initiate a suitable cart control device for energizing the motor 21. This causes the chain 18 to move in a leftwardly direction as indicated by the arrow B in FIGURE 3. Thus, as the chain is moved leftwardly, it overcomes the tension of the spring 22 and the arm is rotated in a clockwise direction as seen in FIGURES 8–10. As a result, the cart is moved from the FIGURE 8 position through the FIGURE 9 position, to the FIGURE 10 position. The positions of the cart wheels are shown in broken lines in said figures. At a point midway between the FIGURE 9 position and the FIGURE 10 position, the leg 47 of the rod 43 engages the pin 16 to move the leg 47 from the vertical position indicated in dotted lines in FIGURE 2 to the essentially horizontal position in the retracted position. This causes the hook 48 to move from a horizontal position wherein the hook is in engagement with the frame 56c of the cart 56 toward a vertical position wherein the hook becomes disengaged from the cart. The checker C can then, if she wishes, take the cart and nest it with other similar carts as illustrated in FIGURE 10 but if she does not do so immediately, the carts will have some tendency to nest themselves and can accumulate without being in the way of either customers or store personnel.

MODIFIED CONSTRUCTION

Another system of cart control is illustrated in FIGURES 11–13. The modified system 60 comprises a bracket arm 61 extending leftwardly from the left end of the checkstand 62. The outer left end of the bracket arm 61 is provided with a bearing housing 63 for rotatably supporting a vertical shaft 64. One end of a bracket 66 is secured to the upper end of the shaft 64 and extends away therefrom at essentially a right angle. The other end of the bracket 66 has an arm 67 secured thereto which extends perpendicularly away therefrom. The arm 67 is provided with a magnet 68 positioned intermediate the ends thereof. The outer end of the arm 67 is provided with a roller 69 rotatable about a vertical shaft 71 (FIGURE 12).

The counter 62 houses a motor and gear reducer 72. An endless belt 73 extends around a drive pulley 74 connected to the output shaft of the motor and gear reducer 72, and a pulley 76 (FIGURE 13). The shaft 77 around which the pulley 76 rotates is connected by a coupling 78 secured to the wall of the counter by a bracket 79 and thence to a flexible shaft 80 and thence to the lower end of the shaft 64 as illustrated in FIGURE 10. The pulley 76 is provided with a lug 91.

A belt tightening device 81 is provided to put tension on the belt 73. The device 81 comprises an idler pulley 82 rotatably secured to a frame member 83. The frame member 83 is slideably mounted on a rod 84. A spring 85 is sleevably mounted over the rod 84 between the head 86 on the right end of the rod 84 (FIGURE 13) and a flange 87 on the left end of the frame member 82.

A limit switch 92 is mounted adjacent the motor 72 for disengaging the power to said motor.

The operation of the modified cart control device 60 is best illustrated in FIGURE 12. Energization of the motor 72 causes the shaft 77 and flexible shaft 79 to rotate. This causes the shaft 64 to rotate about its vertical axis within the bearing housing 63. Thus, the arm 67 is rotated about the axis of the shaft 64 offset therefrom. The magnet 68 magnetically engages the upper portion of the frame 88 of the grocery cart 56, the cart here illustrated for disclosure purposes also being the cart shown in more detail in my above-mentioned copending application. The roller 69 also engages the upper portion of the frame 88. Thus, the arm 67 is driven by the motor 72 against the frame 88 of the grocery cart 56 to move same from the end of the counter 62 in the manner illustrated in dotted lines in FIGURE 12. When the rear 89 of the cart 56 is swung around to engage the side of the counter 62, as illustrated in dotted lines in FIGURE 12, the magnetic coupling between the magnet 68 and the frame 88 is broken as indicated at 93. Nevertheless, the arm 67 continues to rotate so that the roller 69 pushes the cart to the D position. The arm 67 continues to rotate until it is back in its starting position as indicated in solid lines in FIGURE 12 and is stopped by the lug 91 engaging the limit switch 92 to de-energize the motor 72. The cart 56, in this embodiment, is moved to the customer aisle so that the cart will be readily available to the customer for carrying heavy sacks and large quantities of merchandise away from the checkstand. Thus, the cart is always in use by customers in the store and they are not likely to be left in the middle of the floor creating congestion around the checkstand.

The arm 67 can, of course, be constructed as a mirror image of that here shown and can be mounted on the opposite corner P, in which case it will move the carts into the space S on the other side of the checkstand.

The belt tightening device 81 permits the belt 73 to slip when an obstruction appears in the path of a moving cart. This safety feature will prevent injury to customers and working personnel.

Although particular embodiments of the invention have been disclosed in detail for illustrative purposes, it will be understood that variations or modifications of the disclosed apparatus, including the rearrangement of parts, lie within the scope of the present invention.

The embodiments of the invention in which an exclusive property of privilege is claimed are defined as follows:

1. A goods handling system for use with a checkstand, comprising:
   a swing arm having shopping cart engaging means thereon operable to engage a cart at a predetermined cart-engaging location, said cart-engaging means comprising a magnet mounted intermediate the ends of said swing arm and a roller mounted at the free end thereof;
   a shopping cart positioned at said cart-engaging location in an unloading position with one end thereof opposite the swivel wheels placed adjacent an end of the checkstand, said swing arm being pivotally mounted near a corner of said checkstand and at a level enabling said cart-engaging means on said swing arm to engage a horizontally aligned member near the end of said shopping cart adjacent the end of the checkstand;
   driving means for pivoting said swing arm to bring said magnet and said roller into engagement with said horizontally aligned member on said shopping cart, said magnet becoming magnetically coupled to said shopping cart so that continued movement of said swing arm will effect a movement of said end of said shopping cart having the swivel wheels in a direction having a component of motion substantially parallel with an end of said checkstand and said shopping cart is moved in an arc around the point of pivotable mounting of said swing arm until the end of the shopping cart opposite the swivel wheels is adjacent the side of said checkstand, said engaging means being arranged to uncouple said magnet from said cart at a predesignated destination when said end of said shopping cart opposite said swivel wheels reaches a position offset from said end of said checkstand after which said swing arm returns to its initial position.

2. A goods handling system for use with a checkstand comprising:
   a shopping cart having swivel wheels at one end with said shopping cart normally positioned for unloading with the end thereof opposite the swivel wheels placed adjacent an end of the checkstand;
   a swing arm having shopping cart-engaging means thereon operable to engage a cart at a predetermined cart-engaging location, said swing arm being pivotally mounted near an adjacent corner of said checkstand and at a level enabling said arm to engage a member on said shopping cart near the adjacent end thereof;

driving means for moving said arm into engagement with said shopping cart, said driving means further effecting movement of said end of said shopping cart having said swivel wheels in an arcuate path around the pivot axis of said pivotally mounted swing arm until said opposite end of said cart is adjacent the side of said checkstand at which point said cart is released and said swing arm is returned to its initial position.

3. The device defined in claim 2 wherein said swing arm is provided with a magnet intermediate the ends thereof for engaging a selected portion of said shopping cart.

4. The device defined in claim 2 wherein said swing arm is provided with a magnet intermediate its ends for engaging an end of the shopping cart and is further provided with a roller adjacent its free end; and wherein said swing arm is positioned on said checkstand in such position with respect to the normal unloading location of a shopping cart that it will engage the end of said shopping cart opposite that on which the swivel wheels are located.

5. A device as defined in claim 4 wherein said shopping cart is normally positioned for unloading with the end thereof opposite the swivel wheels placed adjacent an end of the checkstand;

wherein said swing arm is provided with a magnet intermediate its ends and a roller at its free end; and wherein said swing arm is pivotally mounted near an adjacent corner of said checkstand, and at a level enabling said magnet and said roller to engage a horizontally aligned member of the adjacent end of said shopping cart;

whereby said swing arm on being caused to pivot will engage said end of said cart, move same in arc around the point of pivotal mounting of said swing arm until the opposite end of said cart strikes the side of said checkstand to break said magnet loose from said cart and thereafter continue to swing with said roller continuing to bear against said cart and urge same in the direction away from the pivot point of said swing arm until said swing arm clears said cart and returns to its point of commencement.

6. A control system for use with a checkstand for controlling the flow of shopping carts after same have been unloaded, which shopping carts are normally positioned for unloading with an end thereof opopsite the swivel wheels placed adjacent an end of the checkstand, said control system comprising:

a swing arm having shopping cart engaging means thereon, said swing arm being pivotally mounted for swinging movement about a pivot axis at said end of said checkstand and at a level enabling said arm to engage a member on a shopping cart positioned near said end of said checkstand and radially from said pivot axis of said swing arm;

driving means for moving said arm and said cart-engaging means into engagement with said shopping cart and effecting an initial movement of the end of said shopping cart having the swivel wheels in a direction perpendicular to the longitudinal center line of the shopping cart; and further including means for effecting an orbital movement of the end of said shopping cart near said end of said checkstand about said pivot axis to move said cart from said end of said checkstand to a position alongside said end of said checkstand.

References Cited

UNITED STATES PATENTS

| | | | |
|---|---|---|---|
| 2,461,088 | 2/1949 | Shortt | 46—45 |
| 2,606,504 | 8/1952 | Stamler | 104—162 |
| 3,196,806 | 7/1965 | Brunder | 104—172 |
| 3,219,205 | 11/1965 | Grant | 104—162 |
| 3,230,896 | 1/1966 | Grant | 104—163 |
| 3,368,646 | 2/1968 | LaChance | 186—1 |

ARTHUR L. LA POINT, Primary Examiner

D. F. WORTH, III, Assistant Examiner

U.S. Cl. X.R.

186—1